United States Patent
Güner

(10) Patent No.: US 9,171,467 B2
(45) Date of Patent: *Oct. 27, 2015

(54) METHOD AND DEVICES FOR IDENTIFYING A VEHICLE USING A LOCATION

(71) Applicant: Kapsch TrafficCom AG, Vienna (AT)

(72) Inventor: Refi-Tugrul Güner, Baden (AT)

(73) Assignee: Kapsch TrafficCom AG, Vienna (AT)

( * ) Notice: Subject to any disclaimer, the term of this patent is extended or adjusted under 35 U.S.C. 154(b) by 283 days.

This patent is subject to a terminal disclaimer.

(21) Appl. No.: 13/868,908

(22) Filed: Apr. 23, 2013

(65) Prior Publication Data

US 2013/0293422 A1 Nov. 7, 2013

(30) Foreign Application Priority Data

May 3, 2012 (EP) .................................. 12166502

(51) Int. Cl.
| | |
|---|---|
| *G08G 1/123* | (2006.01) |
| *G08G 1/127* | (2006.01) |
| *G08G 1/017* | (2006.01) |
| *G07B 15/06* | (2011.01) |
| *G01S 1/02* | (2010.01) |
| *G06Q 10/00* | (2012.01) |

(Continued)

(52) U.S. Cl.
CPC . *G08G 1/127* (2013.01); *G01S 1/02* (2013.01); *G07B 15/063* (2013.01); *G08G 1/017* (2013.01); *B61L 1/00* (2013.01); *G06Q 10/00* (2013.01); *G08G 1/00* (2013.01)

(58) Field of Classification Search
CPC ............. G08G 1/00; G06Q 10/00; B61L 1/00
See application file for complete search history.

(56) References Cited

U.S. PATENT DOCUMENTS 5,686,920 A * 11/1997 Hurta et al. ..................... 342/42
2013/0293397 A1   11/2013 Nagy et al.

FOREIGN PATENT DOCUMENTS

| EP | 0401192 A1 | 12/1990 |
|---|---|---|
| EP | 0689169 A2 | 12/1995 |

(Continued)

OTHER PUBLICATIONS

Extended European Search Report received for application No. 12166502.0, mailed on Jul. 25, 2012, 5 pages.

(Continued)

*Primary Examiner* — Shirley Lu
(74) *Attorney, Agent, or Firm* — Piala & Weaver P.L.L.C.

(57) ABSTRACT

Methods for identifying a vehicle using a predetermined location are provided, as well as a radio beacon and an onboard unit for use with the methods. One method comprises: carrying, on the vehicle, an onboard unit that broadcasts status messages that each indicate a current position of the onboard unit and a radio identifier that changes after each or several status messages; receiving at least one status message in a radio beacon; detecting a location usage of the vehicle by evaluating the status message(s) based on the position(s) indicated therein with respect to the predetermined location; transmitting an identification request from the radio beacon to the onboard unit addressed according to the radio identifier from the status message(s); receiving and conducting a legitimacy check of the identification request in the onboard unit and, if the request is legitimate, transmitting an identification of the onboard unit to the radio beacon.

28 Claims, 6 Drawing Sheets

(51) Int. Cl.
*G08G 1/00* (2006.01)
*B61L 1/00* (2006.01)

(56) References Cited

FOREIGN PATENT DOCUMENTS

| EP | 1519320 | A1 | 3/2005 |
| EP | 2320386 | B1 | 5/2011 |

OTHER PUBLICATIONS

First Examination Report received for New Zealand Patent Application No. 608247, mailed on Mar. 22, 2013, 2 pages.

Non Final Office Action received for U.S. Appl. No. 13/886,072, Mailed on Mar. 26, 2015, 6 pages.

\* cited by examiner

METHOD AND DEVICES FOR IDENTIFYING A VEHICLE USING A LOCATION

CROSS-REFERENCE TO RELATED APPLICATION(S)

This application claims priority to European Patent Application No. 12 166 502.0, filed on May 3, 2012, the entirety of which is incorporated by reference herein.

BACKGROUND

1. Technical Field

The present application relates to a method for identifying a vehicle using a predetermined location, and further relates to a radio beacon and an onboard unit for use with the method.

2. Background Art

Methods for identifying vehicles are required, for example, so as record, monitor, authorize and/or impose tolls (charge fees) for the usage of locations by vehicles. Such usages of locations can, for example, include the entering of areas to which access is limited or that are monitored, a fee-based stay at a particular location, for example a parking lot that is subject to a charge, or the use of traffic routes subject to tolls, such as highways or inner cities (city toll), and the like. According to known vehicle identification methods, license plate numbers (registration plates) are read by way of optical character recognition (OCR), or the vehicles are equipped with onboard units (OBUs) having a unique identification, which can be read out via a radio interface such as dedicated short range communication (DSRC), radio frequency identification (RFID), wireless local area network (WLAN), wireless access for vehicular environments (WAVE), or the like.

So as to create a clear association of a wirelessly read OBU identification with the location used by the vehicle, presently radio beacons, which are used for wireless reading, are mounted on special installations ("gantries") at the location to be monitored and equipped with narrowly defined radio coverage ranges. Alternatively, satellite navigation-based onboard units are employed that transmit the self-located position data via a mobile communication network to a back office, which performs a map matching with the locations to be monitored. All of these known methods require not only special, complex installations, both in the vehicle and on the road, but also disclose the identity of the OBU (in the form of a wirelessly read OBU identification), even if no location usage requiring monitoring exists, which is objectionable for data protection reasons.

BRIEF SUMMARY

It is one object to create methods and devices that allow vehicles using a location to be identified in a simpler manner and with improved confidentiality for uninvolved vehicles.

This object is achieved in a first aspect by a method, comprising: carrying, on the vehicle, an onboard unit that via radio repeatedly broadcasts status messages, which each indicate a current position of the onboard unit and a radio identifier that changes after each or several status messages; receiving at least one status message in a radio beacon; detecting a location usage of the vehicle by evaluating the at least one status message based on the position(s) indicated therein with respect to the predetermined location; transmitting an identification request from the radio beacon to that onboard unit which is addressed by way of the radio identifier from the at least one status message; receiving and conducting a legitimacy check of the identification request in the onboard unit and, if the request is legitimate; and transmitting a unique identification of the onboard unit to the radio beacon, the unique identification remaining the same over several changes of the radio identifier.

An aspect is based on a novel integration of onboard units transmitting status messages, such as those known, for example, from the ITS-G5 or WAVE (IEEE 802.11p) standards, in the form of common awareness messages (CAM) or basic safety messages (BSM). The messages are emitted as repeated broadcasts so as to warn or notify neighboring onboard units or roadside infrastructure in order to avoid collisions or provide the driver with an improved overview of the situation. So as to render the creation of movement profiles of a vehicle more difficult, the status messages are send only under temporary radio identifiers, which change from time to time and are not known to the system operators, so as to protect the privacy. Only the temporary radio identifiers of at least one status message of the onboard units are evaluated. Only after the usage of the location has been detected—anonymously as a result of the temporary radio identifiers—is the onboard unit requested to reveal the "true" identity thereof, for example payment, use or application identity. This ensures that in fact only those onboard units are identified, which used the predetermined location; onboard units of third-party vehicles, which merely pass the location in the vicinity or turn around just before actual usage of the location, and the like, are not identified, which is to say they remain anonymous. Consequently, high data protection requirements in terms of privacy can be satisfied, without necessitating complex road-side installations, OBU modifications or separate anonymization devices such as proxy computers.

In a further aspect, at least two status messages are received in a radio beacon and are associated with each other based on the radio identifiers indicated therein, and the location usage of the vehicle is detected by evaluating the mutually associated status messages based on the positions indicated therein with respect to the predetermined location.

By mutually associating and evaluating at least two status messages, an onboard unit is tracked over a short period of time, which is sufficient to be able to establish the usage of a particular location with high certainty. Even two or just a few status messages that can be associated with one and the same onboard unit may suffice for this purpose to exclude measurement errors and reliably detect a movement that has occurred. In the simplest case, such a detected location usage can be the crossing of a predetermined boundary, if the first status message indicates a position in front of the boundary and the second status message indicates a position behind the boundary, so as to detect a location usage.

According to another aspect, the legitimacy check is carried out by checking a cryptographic sender certificate of the radio beacon that is transmitted by the radio beacon along with the identification request. The onboard unit thus discloses the identity thereof only to identified, legitimate inquirers, which further improves the protection of privacy.

For the same reason, it may be advantageous for the identification of the onboard unit to be transmitted to the radio beacon via an encrypted channel. Direct (point-to-point) encrypted communication can be established between the onboard unit and inquiring radio beacon for this purpose. For example, the encrypted communication channel can be part of the protocol at the radio interface between the onboard unit and the radio beacon, for example part of the ITS-G5 or WAVE standard, but alternatively could also be established separately via a 3G, 4G or 5G mobile communication network.

In another aspect of an identification method, the identification received in the radio beacon is recorded together with a time stamp in a memory so as to log the location usage, for example for monitoring purposes.

In an alternative application, the identification received in the radio beacon is compared to at least one previously stored legitimate identification so as to authorize the location usage, for example so as to open gates, lower a wheel lock, deactivate an enforcement system or the like.

In another application of the identification method, the identification received in the radio beacon is used to search for and debit a toll account associated with the identification, so as to toll the location usage, for example so as to levy a location and/or time toll, parking fees, road usage fees, city toll or the like.

In all three variants, the radio beacon can transmit a beacon identifier that is unique to the radio beacon to the onboard unit after logging, authorization or tolling of the location usage, the onboard unit storing this identifier and transmitting the same along with the next broadcast of the status message(s) thereof or transmission of the identification thereof, and the radio beacon can ignore a status message or identification received from an onboard unit, if the beacon identifier received along therewith is identical to its own beacon identifier. Inadvertent double logging, authorization or tolling of one and the same onboard unit in the radio coverage range of a radio beacon can thus be prevented.

According to a further aspect, more than two status messages can be received and associated with each other, and a movement path of the onboard unit can be calculated based on the positions indicated in these messages, the path being compared to the predetermined location so as to detect the location usage. This allows the detection reliability to be increased and, for example, "measurement outliers" to be better suppressed.

It may be advantageous if the respective radio identifier is changed after approximately 5 to 1000 status messages, including being changed after 20 to 100 status messages. The more frequently the radio identifier changes, the greater is the data protection in terms of the traceability of a particular onboard unit; the less frequently the radio identifier changes, the lower is the risk that the radio identifier around the location to be detected changes, which would make detection more difficult. The values indicated above constitute a good compromise between these mutually opposing requirements.

As an alternative, the change interval of the radio identifier of the onboard unit can also be set so that the radio identifier is changed at the earliest after expiration of a predetermined time period. Based on the size of a customary radio coverage range of a radio beacon and an average speed of onboard units, the predetermined time period can be selected so that no radio identifier change takes place with high certainty when an onboard unit passes a radio beacon.

Another aspect is to keep the radio identifier the same while the onboard unit is located in the radio coverage range of one and the same radio beacon. For this purpose, for example, the onboard unit can directly measure the radio coverage range of a radio beacon if the radio beacon periodically broadcasts beacon identifiers, or can determine the same based on previously stored lists or maps of radio coverage ranges of known radio beacons, or be notified by a radio beacon as part of one of the broadcasts or the identification request of the beacon.

The status messages can also contain a current movement vector of the onboard unit, which is also used during detection of the location usage so as to further increase the detection reliability.

According to a further aspect, the position of the onboard unit can be determined by way of satellite navigation and improved by referencing to a reference position of the radio beacon that was determined by way of satellite navigation, in the manner of differential GPS (dGPS), wherein the radio beacon forms the reference receiver so as to improve the positions of the onboard units determined by way of satellite navigation.

As an alternative, the position of the onboard unit can be determined by way of satellite navigation and improved by referencing to at least one further position of a neighboring onboard unit that was determined by way of satellite navigation. This embodiment is based on the assumption that, given the proximity to each other, the onboard units that are present in the radio coverage range of a radio beacon are each subject to the same satellite navigation errors and neighboring OBUs thus can be used as comparison receivers in the manner of dGPS.

In general, a radio beacon could be used to detect location usages in the immediate or wider environment thereof, or even in remote territories outside the radio coverage range thereof; however, the radio coverage range of the radio beacon may contain the predetermined location, so that each radio beacon is in charge of location usages in the immediate surroundings thereof and thus receives current and local measurement data from onboard units.

As mentioned above, the predetermined locations, the location usages of which are to be detected, can be of a general nature. According to a first embodiment, such a location is a geographical point and the location usage is the drop below a maximum distance from the point, as an alternative, the location can be an area and the location usage can be the presence in the area; or the location can be at least one road segment and the location usage can be driving on the at least one road segment.

Because areas and road segments can frequently be defined by a boundary, according to an aspect, the location is a boundary and the location usage is a crossing of the boundary, wherein the boundaries are represented on a digital road map with vectorized road segments, comprising: determining a point of intersection of the boundary with a road segment and a reference direction in the orientation of this road segment; successively projecting vectors, each determined between one of the positions from the aforementioned status messages and the point of intersection, onto the reference direction so as to obtain a sequence of projections; and detecting a crossing of the boundary if a change of direction or sign occurs in the sequence of projections.

A crossing of a boundary can thus be reliably detected with certainty using simple means; detection errors, as they occur with a turnaround in front of the boundary, for example, can be reliably excluded.

The projections of the position vectors onto the reference direction can be determined in a variety of ways. According to a first embodiment, the projecting is done by finding vectorial inner products of the vectors with the reference direction, and a crossing of the boundary is detected by a change of sign of the inner products. In an alternative embodiment, the projecting is done by transforming the vectors into a local coordinate system with the reference direction as the x-axis, and a crossing of the boundary is detected by a change of sign of the x-coordinates. Both variants can be calculated with relatively low computing power and therefore also suitable for real-time implementations, both in decentralized map matching OBUs (thick clients) and in central map matching servers of a road toll system.

An embodiment may further include validating the crossing of the boundary if the absolute values of the two projections before and after the change of direction or sign exceed a predetermined minimum. This also allows inaccuracies in the position determinations to be taken into consideration and particularly reliable detection of the passing of the virtual boundary to be achieved.

Another embodiment may include the additional step of validating the crossing of the boundary if the normal distances of the two positions before and after the change of direction or sign with respect to the reference direction do not exceed a predetermined maximum. This additional checking step allows a faulty detection to be excluded when traveling on nearby parallel roads.

In a second aspect, a radio beacon is created for identifying a vehicle using a predetermined location, the vehicle carrying an onboard unit that via radio repeatedly broadcasts status messages, which each indicate a current position of the onboard unit and a radio identifier that changes after each or several status messages, wherein the radio beacon is configured to, with the aid of a processor and a transceiver connected thereto: receive at least one status message; detect a location usage by evaluating the at least one status message based on the position(s) indicated therein with respect to the predetermined location; transmit an identification request to that onboard unit which is addressed by way of the radio identifier of the at least one status message; and receive a unique identification of the onboard unit that remains the same over several radio identifier changes.

In an aspect, the radio beacon may be configured to receive at least two status messages and associate these with each other based on the radio identifiers indicated therein, and detect the location usage of the vehicle by evaluating the mutually associated status messages based on the positions indicated therein with respect to the predetermined location.

The radio beacon may contain a cryptographic sender certificate and may be configured to transmit the same along with the identification request.

In a third aspect, an onboard unit is created comprising a processor, a satellite navigation receiver for position determination, and a transceiver for radio communication. The onboard unit is configured to: repeatedly broadcast status messages via radio using the transceiver, each message containing a position determined by the satellite navigation receiver and a radio identifier of the onboard unit that changes after several status messages; receive an identification request from a radio beacon, the request being addressed to the current radio identifier of the unit and containing a cryptographic sender certificate; validate the sender certificate; and if the same is valid; and transmit a unique identification of the onboard unit to the radio beacon, the identification remaining the same over several radio identifier changes.

The status messages of the onboard unit may be CAMs according to the ITS-G5 standard or BSMs according to the WAVE standard.

Further features and advantages of the invention, as well as the structure and operation of various embodiments of the invention, are described in detail below with reference to the accompanying drawings.

BRIEF DESCRIPTION OF THE DRAWINGS/FIGURES

With regard to additional characteristics and advantages of the radio beacon and onboard unit, reference is made to the above descriptions of the method, and the description below of embodiments, which is provided referencing the accompanying drawings, in which.

Embodiments will now be described with reference to the accompanying drawings.

DETAILED DESCRIPTION

Figure 1:
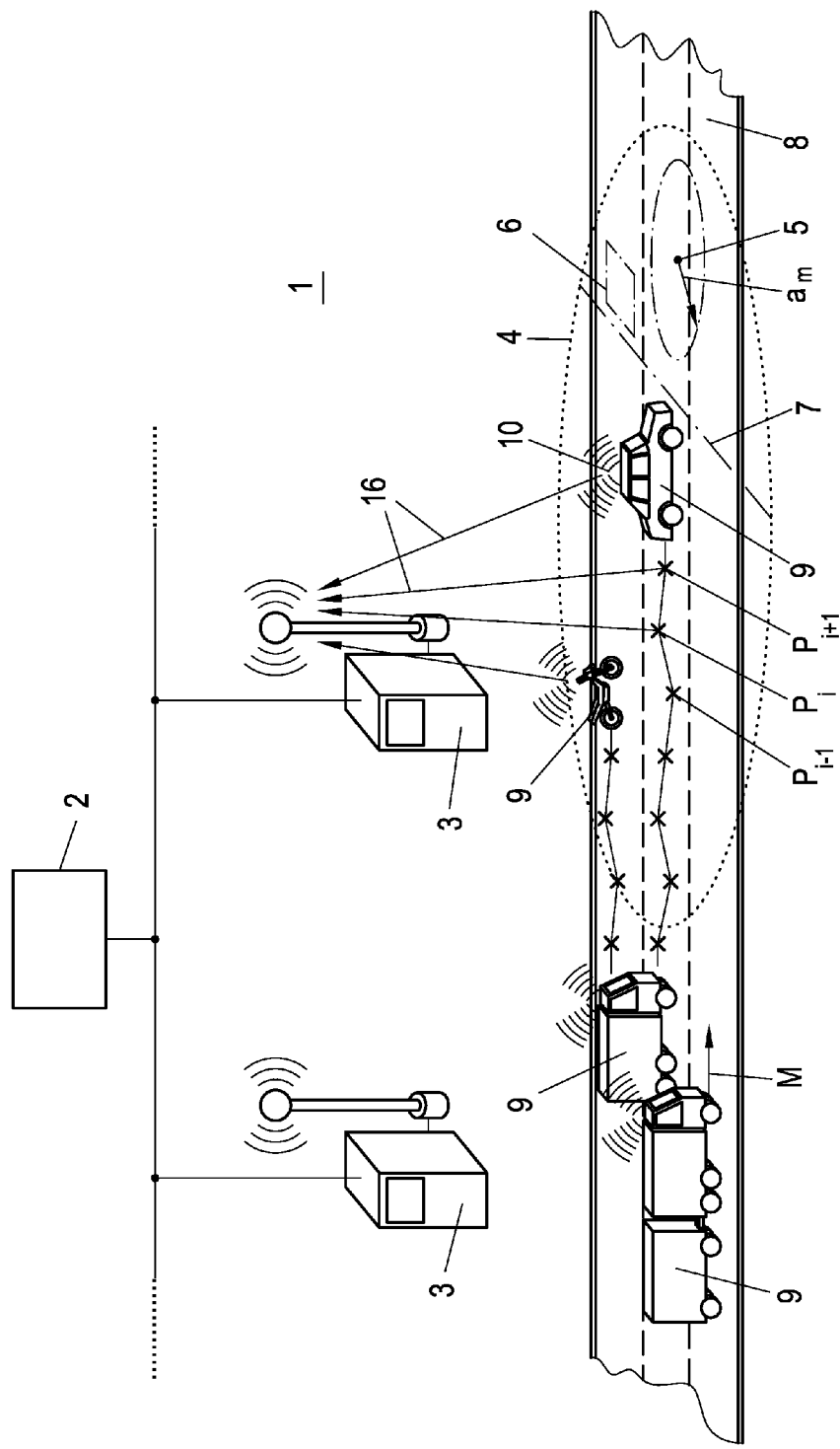
FIG. 1 shows a schematic overview of components, including the radio beacon and several onboard units, acting according to an example method embodiment.

FIG. 1 shows a road toll system 1 as an exemplary application of the identification method, comprising a back office 2 and a plurality of geographically distributed roadside radio beacons (roadside entities, RSE) 3 that are connected thereto. Each of the radio beacons 3 has a limited radio coverage range 4, for example a wireless radius of 200 meters, within which predetermined locations such as points 5 ("virtual toll plazas"), areas 6 (for example parking lots), boundaries 7 (for example virtual gantries, inner city boundaries or the like) or road segments 8 are defined, wherein the locations 5-8 can also be entirely or partially located outside the radio coverage range 4. They may be located (at least partially) inside the radio coverage range 5, which simplifies the association of a radio beacon 3 with the locations 5-8 for which the beacon is in charge.

The radio beacons 3 detect location usages of vehicles 9 that pass the radio coverage range 4 of the beacons, which is to say whether—and optionally how long—these use one of the locations 5-8, and identify such vehicles 9 that use the locations. Vehicles 9 that do not use any of the locations 5-8 are not to be identified, which is to say remain anonymous.

For the purposes mentioned above, all vehicles 9 are equipped with onboard units (OBUs) 10, the configuration of which will be described in more detail based on FIG. 2.

Figure 2:
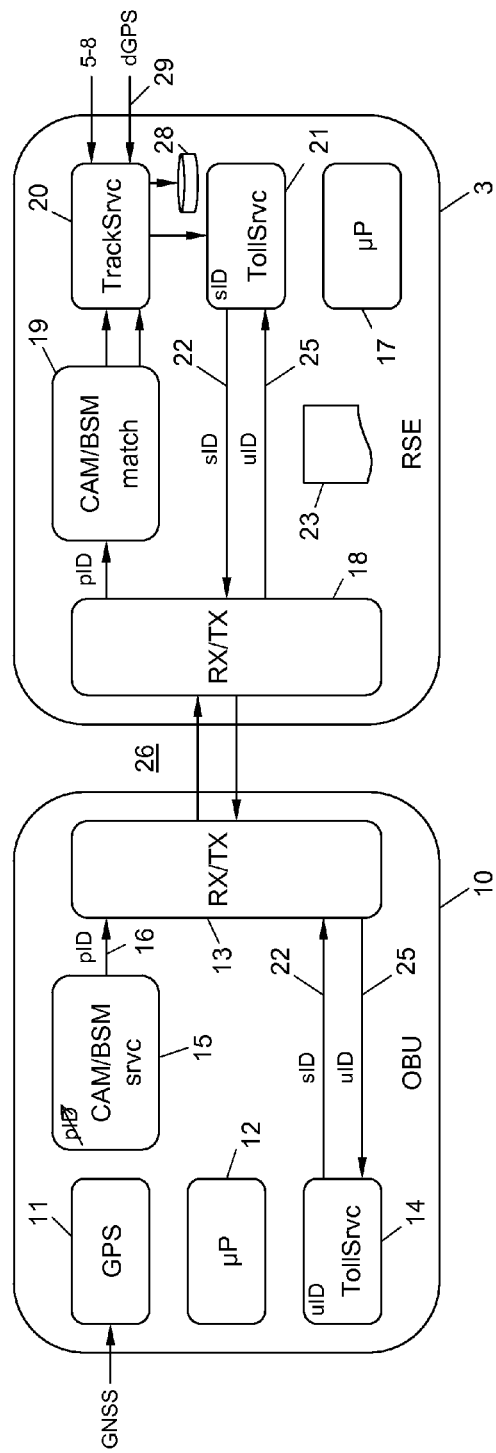
FIG. 2 shows a block diagram and signal flow chart of a method, according to an example embodiment.

According to FIG. 2, each OBU 10 comprises a satellite navigation receiver 11 for successively repeated determining the respective current position ("position fix" $P_1, P_2, \ldots, P_i$ in general, of the unit in a global satellite navigation system (GNSS) such as GPS, GLONASS, Galileo or the like. Moreover, the OBU 10 is equipped with a processor 12 and a transceiver 13, wherein some of the data connections between the satellite navigation receiver 11, processor 12 and transceiver 13 are not shown for clarity reasons.

Reference numeral 14 schematically denotes a service application that can be executed by the processor 12, for example a toll application, which can cooperate with the radio beacons 3 and the back office 2 of the road toll system 1 in a manner that will be described hereafter and for this purpose has an OBU identifier uID that is unique ("unique ID") in the road toll system 1. For example, the OBU identification uID can be a unique production identifier of the OBU 10, the name of the owner thereof, the name of the owner of the vehicle on which the OBU 10 is mounted, an account or credit card identifier of the vehicle owner or the like. In the road toll system 1, the OBU identification uID is known to the back office 2 and/or the radio beacons 3 and can be used there for identifying the vehicle 9 that carries the OBU.

Reference numeral 15 denotes a security application which is processed by the processor 12 and by way of which the OBU 10 successively repeatedly, periodically approximately every 100 ms or other value, broadcasts a status message 16 via the transceiver 13. The status message 16 is intended to be received by OBUs 10 of neighboring vehicles 9 and/or roadside infrastructure, such as the radio beacons 3, and requires neither a confirmation of receipt nor actual receipt; the application 15 transmits status messages 16 via the transceiver 13 regardless of whether or not these are received by a receiver, however optionally the application can also be requested to do so by radio beacons 3 or other OBUs 10.

Each of the status messages 16 contains (at least) the last position $P_i$ of the OBU 10 determined by the satellite navigation receiver 11, and optionally additional data, for example the speed and direction of movement (movement vector) M, height, measurement accuracy, and the like. Each status message 16 is provided with a temporary radio identifier pID, so that neighboring OBUs or infrastructure can correlate, which is to say associate, consecutive status messages 16 with each other based on the temporary radio identifier pID, so as to be able to determine, at least over a short period of time, the movement path (trajectory) of an OBU 10 based on the positions $P_i$ from consecutive status messages 16.

Onboard units 10 comprising safety applications 15 for sending such status messages 16 are defined in the ITS-G5 and WAVE (IEEE 802.11p) standards, for example. Status messages 16 of this type are referred to as common awareness messages (CAM) in the ITS-G5 standard and as basic safety messages (BSM) in the WAVE standard (notable SAE J2735). The temporary radio identifier pID of a status message 16 can, for example, be a temporary IP6 address, a MAC address or pseudo MAC address of the OBU 10, an exact or generalized geographical position (location coordinates) of the OBU 10, or the like. In the simplest case, the temporary radio identifier pID can thus even be identical to the position $P_i$ of the OBU 10. The radio identifier pID is not known in the road toll system 1 or to the back office 2 and the radio beacons 3 and has no significance there; for example, it can also be randomly selected by an OBU 10. The radio identifier pID also "temporary" in the sense that the same changes after a particular number of status messages 16 so as to suppress tracking of a particular OBU 10 over an extended period. For example, the radio identifier pID is changed after every fifth to thousandth, such as every twentieth to hundredth, status message 16. This method is shown in more detail in the sequence diagram of FIG. 3.

As an alternative, the radio identifier pID can be changed after a predetermined time period, or the change can be selectively omitted, which is to say suppressed by the onboard unit 10, while the same is present in the radio coverage range 4 of one and the same radio beacon 3. For this purpose, the onboard unit 10 can have previously stored information about the size of the radio coverage range 4, for example in the form of lists or maps, or have been notified thereof by a radio beacon 3, be it in the form of period broadcasts of a radio beacon 3 or as part of the messages 22, 27 and 27' described below.

Figure 3:
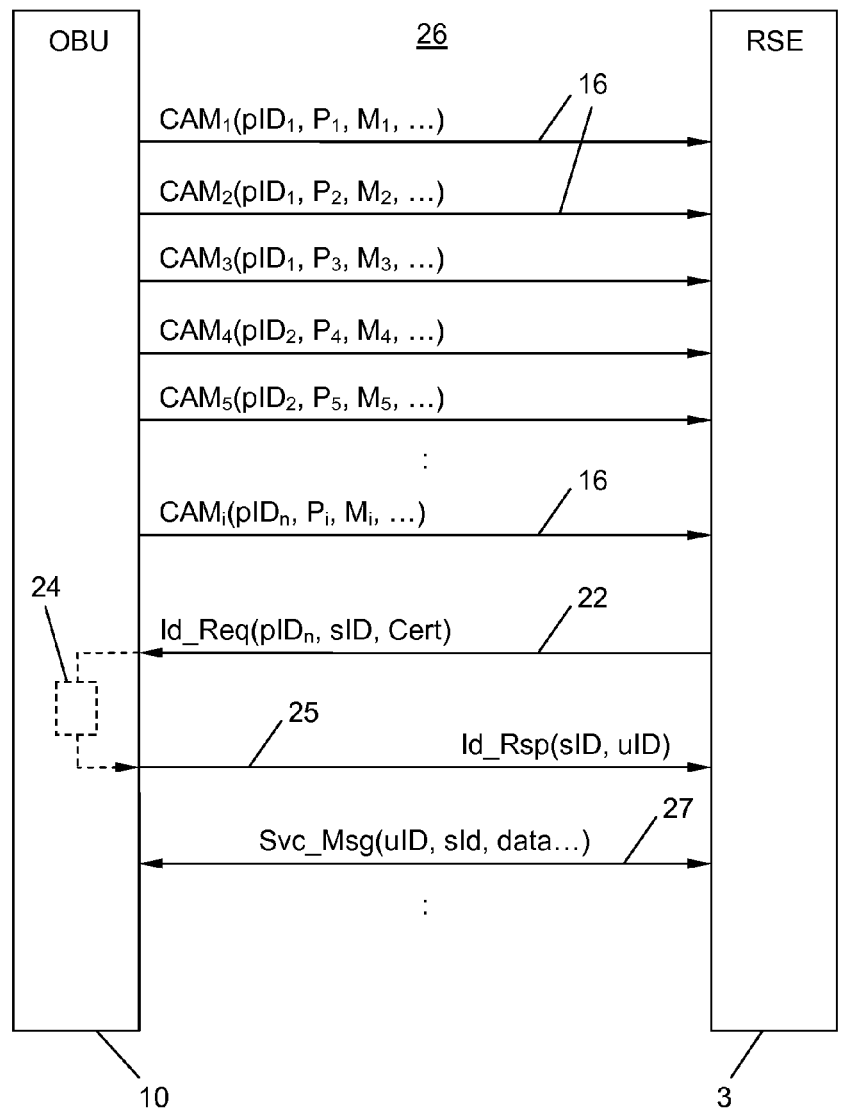
FIG. 3 shows a sequence diagram of the exchange of messages at the radio interface between the radio beacon and onboard unit, according to an example embodiment.

According to FIG. 3, the OBU 10 repeatedly transmits status messages 16, here denoted by $CAM_1$, $CAM_2$, $CAM_3$, ..., or $CAM_i$ in general. In the example shown, the radio identifier $pID_n$ changes after the first three status messages 16, or $CAM_1$, $CAM_2$, $CAM_3$ from $pID_1$ to $pID_2$, and so forth. At the ith status message $CAM_i$, the nth radio identifier $pID_n$ is used ($n \ll i$).

As a result, it is statistically very likely that two consecutive status messages 16 can be associated with each other based on the identical radio identifier $pID_i$ thereof; it is only during the change of the radio identifier from $pID_n$ to $pID_{n+1}$ that a direct correlation of the status message 16 before and after the change of the radio identifier is not possible. In this case, a correlation of the status messages 16 is also possible by tracking the movement history of the onboard unit 10, for example by evaluating the speed thereof, directional vector thereof or the like, be it that this information is provided directly by the OBU 10 in the status messages 16 or measured by the radio beacon 3. It is also possible to store properties of the vehicle 9 that carries the OBU 10, such as the vehicle width, length, height or the like, in the OBU 10 and for the same to be conveyed in the status messages 16 or measured by the radio beacon 3, so as to increase the reliability of the correlation.

According to FIGS. 1 to 3, a radio beacon 3, which receives the status messages 16 of all OBUs 10 passing in the radio coverage range 4 thereof, is thus able to associate the status messages 16 originating from a particular OBU 10 with each other based on the radio identifiers pID and thus track the trajectory of the OBU 10 based on the positions $P_i$. For this purpose, the radio beacon 3 according to FIG. 2 comprises a processor 17, a transceiver 18 and an association process 19, which the processor 17 processes and which filters the flow of arriving status messages 16 with regard to correlating radio identifiers pID and feeds the positions $P_i$ from mutually associated status messages 16 to a tracking process 20 that the processor 18 processes. If the radio identifiers pID directly correspond to the positions $P_i$ or to geographical positions generalized therefrom, the association process 19 can also carry out the mutual association of the status messages 16 with each other based on a movement history ("tracking") of the OBU 10. The tracking process 20 thus compares the positions $P_i$ thus obtained to the predetermined locations 5-8, so as to detect location usages.

The location usage can be detected in a variety of ways. If the location to be detected is a point 5, a location usage can, for example, be detected when a predetermined number or a mean value of positions $P_i$ is located inside a maximum distance $a_m$ from the point 5. If the location is an area 6, a location usage can, for example, be detected when a predetermined number or a mean value of positions $P_i$ is within the area 6. If the location is a road segment 8, a location usage can be detected when, for example, the positions $P_i$ indicate travel on the entire road segment 8, from the beginning thereof to the end thereof, or travel on a predetermined succession of multiple consecutive road segments 8 or the like. If the location is a boundary 7 (which incidentally can also be used to delimit the scope around the point 5, the area 6 or the road segment 8), the location usage can be detected as a crossing of the boundary, and more particularly in the manner that will be described hereafter with reference to FIGS. 4 to 6.

In a simplified embodiment, the radio beacon 3 can detect a location usage already from a single status message 16, so that the association process 19 can be eliminated. In this case, for example, a location usage can be detected when a single position $P_i$ is located within the maximum distance $a_m$ around the point 5, or in the area 6, or on a road segment 8. If the status message 16 contains additional data, such as the speed and the movement direction, notably a movement vector M, of the OBU 10, usage of a location can also be detected when an extrapolation of the movement of the OBU 10 in the past or future shows that the unit just a moment ago used, is in the process of using, or will shortly use a location, for example has crossed or will cross the boundary 7.

As soon as the tracking process 20 detects a location usage, the process starts a service application 21 which is in charge of this location usage and which the processor 17 will process. The application 21 can, for example, be a logging, monitoring or authorization service, so as to record the detected location usage—identified for the OBU 10—or monitor the same, or authorize additional steps such as the opening of an access barrier, or the like. In the present example, the service application 21 is a tolling service that has the service identification sID and can impose tolls (charge fees) for the usage of the location by the OBU 10.

The service application 21 now transmits an identification request Id_Req 22, optionally together with the service identification sID thereof, via the transceiver 18 to the OBU 10 having the radio identifier pID that was indicated in the status messages 16 associated by the association process 19, refer also to FIG. 3. The identification request 22 may contain a cryptographic sender certificate "Cert" 23 of the radio beacon 3 so as to authenticate the same with respect to the onboard unit 10.

The OBU 10 addressed by way of the radio identifier pID receives the identification request 22 and forwards the same to the corresponding process, which here is the toll application 14. If the identification request 22 contains a sender certificate 23, the OBU 10 can check the authenticity of the certificate 23 in an optional step 24 (FIG. 3); if this certificate is authentic or valid, the remaining steps are carried out; if not, the identification request 22 is ignored.

The OBU 10 responds to the identification request 22 by releasing (disclosing) the identification uID thereof, which is unique throughout the system, which is to say consistently unique even over multiple changes of the radio identifier pID, see the declaration message Id_Rsp 25, which the unit returns to the transceiver 18 of the radio beacon 3 via the transceiver 13. The declaration message 25 may contain the service identifier sID of the polling service application 21 of the radio beacon 3, so that the declaration message can be supplied there to the correct service application 21.

From now on, the OBU 10 is identified with the unique identification uID thereof with respect to the service application 21, and the latter is identified with the service identifier sID and the certificate 23 thereof with respect to the OBU 10 or the toll application 14. Additional service-specific messages Svc_Msg 27 can now be exchanged between the transceiver 13 of the OBU 10 and the transceiver 18 of the radio beacon 3 via the radio interface 26. For example, the messages 27 can be service packs of a conventional toll log for tolling the usage of the location. The OBU identification uID can, for example, reference a toll account in the radio beacon 3 or the back office 2, which is debited the toll fees for the location usage. As an alternative, the identification uID could be compared to (at least) one legitimate (reference) identification $uID_{ref}$ that was previously stored in the radio beacon 3 or the back office 2, wherein if identical the identification uID is authorized, for example, to access a location or receive a service.

As soon as the radio beacon 3 and the OBU 10 have been authenticated with respect to each other, in particular by evaluation of the sender certificate 23 of the radio beacon 3, all subsequent communication, such as the declaration message 25 and the ensuing service messages 27, can be transmitted in encrypted form via the radio interface 26, for example as encrypted point-to-point communication. Such an encrypted transmission channel could alternatively be established via a mobile communication network (not shown), instead of via the radio interface 26, for example directly with the back office 2.

In a simplified embodiment, in which the radio beacon 3 does not perform a tolling function, but is merely used to identify the vehicles 9 or OBUs 10, the determined identifications uID of the onboard units 10 can also simply be recorded—for example in each case together with a current time stamp t—in a memory 28 of the radio beacon 3 or back office 2 for logging purposes.

Following successful logging, authorization or tolling of a location usage, the radio beacon 3 can transmit a confirmation message "ok" to the OBU 10 in an optional step 27' and transmit in this message (optionally again) a unique beacon identifier bID. The OBU 10 can store beacon identifiers bID received from radio beacons 3 and transmit at least the respective last beacon identifier bID received in one (or more) of the status messages 16 and/or in the disclosure of the identification uID thereof to a radio beacon 3 in step 25. The radio beacon 3 can thus ignore or suppress status messages 16 and/or identification transmissions 25, with which the same receives a beacon identifier bID that is identical to its own beacon identifier bID, so as to avoid double processing of one and the same passing OBU 10.

During the detection of location usages in the tracking process 20, the positions $P_i$ of an OBU 10 can be improved by comparison to known reference positions—or at least to third-party positions that are subject to the same measurement errors—as is known from the field of differential GPS (dGPS). For example, the radio beacon 3 can have a dedicated satellite navigation receiver (not shown), which measures reference positions $P_{ref,i}$ of the radio beacon 3 at approximately the same times at which the positions $P_i$ are generated. Having knowledge of the previously known position of a stationary radio beacon 3, the positions $P_i$ determined by way of satellite navigation can then be placed in relation to the reference positions $P_{ref,i}$—which are subject to approximately equivalent measurement errors—and measurement errors can thus be compensated for, refer to path 29 in FIG. 2. The respective positions $P_i$ determined at similar times for neighboring OBUs 10 could be used in the same manner to correct the measurement errors of the positions $P_i$ generated by an OBU 10 of interest.

Figure 4:
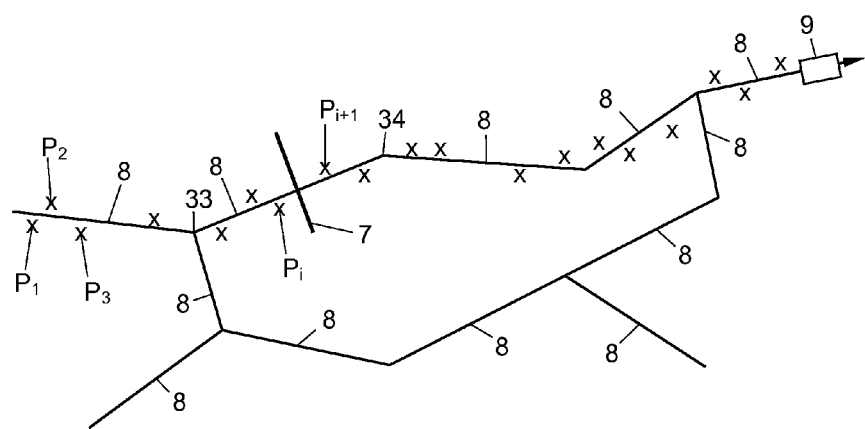
FIG. 4 shows a schematic overview of the movement of an object on a digital road map, according to an example embodiment.
Figure 4:
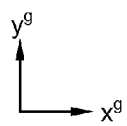
Figure 5:
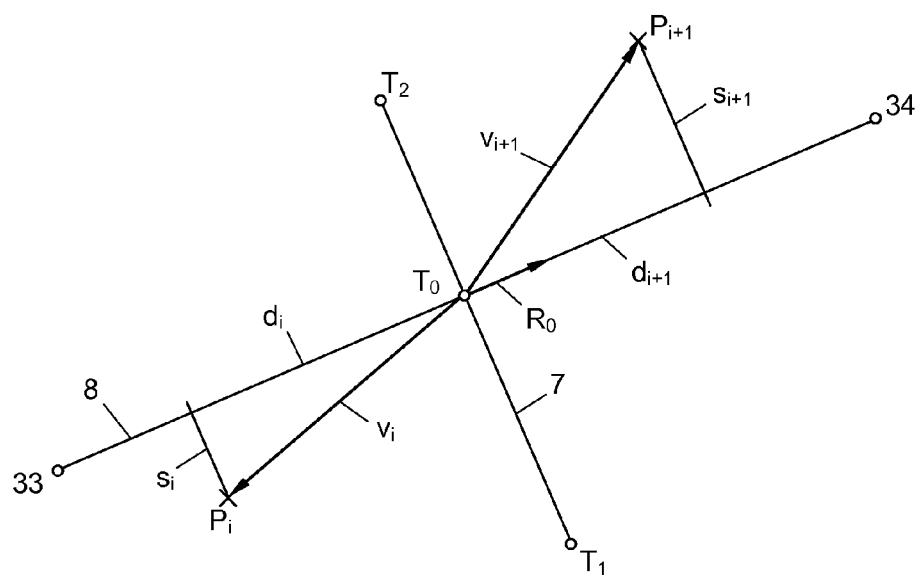
FIG. 5 shows a first embodiment of a method for detecting the crossing of a boundary by way of vectorial inner product finding.
Figure 6:
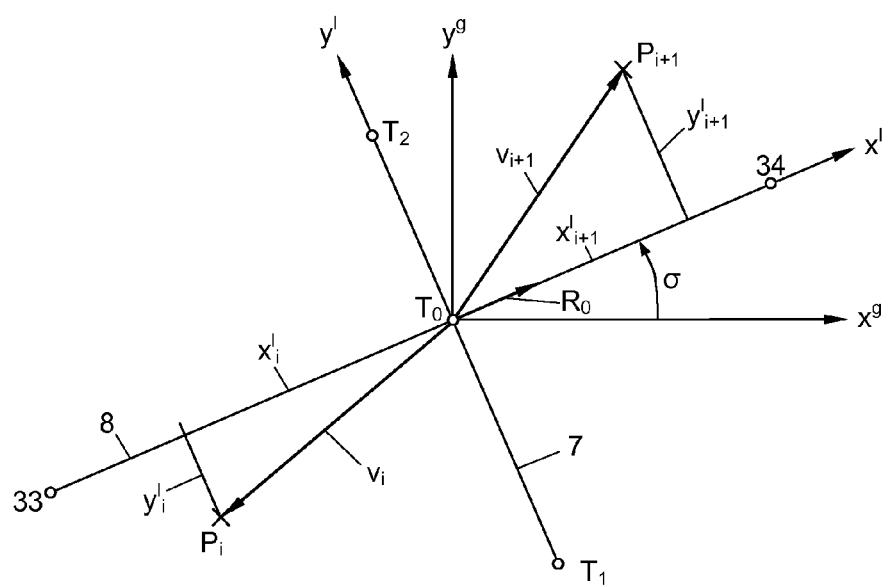
FIG. 6 shows a second embodiment of a method for detecting the crossing of a boundary by way of coordinate transformation.

FIGS. 4 to 6 show a suitable method for detecting a location usage as part of the tracking process 20. The method of FIGS. 4 to 6 is used in particular to detect a crossing of a boundary 7, wherein the boundary 7 can also be the delimitation of the area 6, the circumference of the point 5, or a border around the road segment 7, for example.

FIG. 4 shows a sectional view of a digital road map 31 comprising a plurality of road segments 8 that form a road system. The road segments 8 are vectorized, which is to say defined in each case by the starting and ending points 33, 34 thereof in a global coordinate system $x^g/y^g$ of the road map 31, is known from the prior art.

One of the road segments 8 intersects at least one virtual boundary 7. The boundary 7 can also be located at the starting or ending point 33, 34 of a road segment 8, which is to say at the connecting site of two or more road segments 8; in this case, the boundary can be considered to be associated with one of these road segments 8.

The boundary 7 can be defined as a vectorized section having a starting point $T_1$ and an ending point $T_2$, based on which the point of intersection $T_o$ thereof with the transversing road segment 8 can be directly determined. Alternatively the boundary 7 can also be defined directly as this point of intersection $T_0$.

The movement of a vehicle 9, which by way of the OBU 10 successively determines positions $P_i$ ("position fixes") in the global coordinate system $x^g/y^g$, is represented on the road map 31 by the sequence of positions $P_1, P_2, \ldots, P_i$. In the example shown in FIG. 4, the vehicle 9 travels on the roadway shown above, including the road segment 8 comprising the boundary 7. The vehicle 9 passing the boundary 7 is detected as follows by evaluation of the positions $P_i$.

FIG. 5 shows two exemplary consecutive positions $P_i$, $P_{i+1}$, which were determined immediately in front of and behind the boundary 7. Because of inaccuracies of the position determination, for example GNSS inaccuracies, the positions $P_i$, $P_{i+1}$ are generally not located exactly on the road segment 8, but at a normal distance $s_i$ or $s_{i+1}$ thereto.

For each position $P_i$ of the sequence of positions, which here are $P_i$ and $P_{i+1}$ by way of example, a vector $v_i$ between this position and the point of intersection $T_0$ of the boundary 7 with the road segment 8 is calculated. The respective vectors $v_i$ are subsequently—or immediately after being calculated—projected onto the road segment 8, or more precisely onto a reference direction $R_0$ of the road segment 8, whereby a sequence of projections $d_i$ is obtained. The reference direction $R_0$ is located in the orientation of the road segment 8 and may—although not necessarily—have the length one (unit vector).

In the embodiment shown in FIG. 5, the projections $d_i$ are formed by finding a respective vectorial inner product between the vectors $v_i$ and the reference direction $R_0$, which is to say $$d_1 = \overrightarrow{T_0P_1} \cdot \overrightarrow{R_0} = \overrightarrow{v_1} \cdot \overrightarrow{R_0}$$
$$\vdots$$
$$d_i = \overrightarrow{R_0P_i} \cdot \overrightarrow{R_0} = \overrightarrow{v_i} \cdot \overrightarrow{R_0}$$
$$d_{i+1} = \overrightarrow{T_0P_{i+1}} \cdot \overrightarrow{R_0} = \overrightarrow{v_{i+1}} \cdot \overrightarrow{R_0}$$
$$\vdots$$

If a change of sign (change of direction) occurs in the sequence of projections (inner products) $d_i$ thus found, the boundary 7 has been crossed and a crossing is detected.

Optionally, it can additionally be checked whether the absolute values of the two projections $d_i$, $d_{i+1}$ before and after the change of direction or signs exceed a predetermined minimum min, which is to say $|d_i| > $ min and $|d_{i+1}| > $ min. If so, the previously detected crossing of the boundary is accepted ("validated"). This allows faulty detections due to positioning accuracies to be prevented.

As a further validation stage, it is also possible to evaluate the normal distances $s_i$ of the positions $P_i$ of the road segment 8. To this end, it is checked whether the two normal distances $s_i$, $s_{i+1}$ before and after the previously detected change of direction or signs are smaller than predetermined maxima $max_1$, $max_2$, $max_3$, which is to say $|s_i| < max_1$ and $|s_{i+1}| < max_2$, wherein the maxima $max_1$ and $max_2$ can also be identical and/or $|s_i - d_{i+1}| < max_3$. This check allows faulty detections, for example when traveling on nearby parallel road segments 8 having no boundaries 7, to be excluded.

FIG. 6 shows an alternative embodiment for calculating the projections $d_i$ of the vectors $v_i$. Here, based on the reference direction $R_0$, a local coordinate system $x^1/y^1$ with the reference direction $R_0$ as the x-axis $x^1$ is created, and the vectors $v_i$ calculated in the global coordinate system $x^g/y^g$ are transformed into the local coordinate system $x^1/y^1$, more specifically by applying the rotation matrix $$R = \begin{bmatrix} \cos\sigma & -\sin\sigma \\ \sin\sigma & \cos\sigma \end{bmatrix}$$

where $\sigma \ldots$ is the angle between $x^1$ and $x^g$.

The vectors $v^1_i$ transformed into the local coordinate system $x^1/y^1$ thus result as $$\overrightarrow{v^1_i} = R^{-1}\overrightarrow{v_i} = \begin{bmatrix} x^1_i \\ y^1_i \end{bmatrix}$$

$$\overrightarrow{v^1_{i+1}} = R^{-1}\overrightarrow{v_{i+1}} = \begin{bmatrix} x^1_{i+1} \\ y^1_{i+1} \end{bmatrix}$$

The x-coordinates $x^1_i$ and $x^1_{i+1}$ of the transformed vectors $v^1_i$, $v^1_{i+1}$ in turn correspond to the projections $d_i$ and $d_{i+1}$. A change of sign, as that which occurs between the projections $x^1_i = d_i$ and $x^1_{i+1} = d_{i+1}$, again indicates the crossing of the boundary.

The projections $x^1_i$, $x^1_{i+1}$ here can also be checked, in the manner described above, for exceeding the minimum min, which is to say whether $|x^1_i| > $ min and $|x^1_{i+1}| > $ min.

The y-coordinates $y^1_i$ and $y^1_{i+1}$ of the transformed vectors $v^1_i$, $v^1_{i+1}$ correspond to the normal distances $s_i$, $s_{i+1}$ and can again be checked for adherence to the maximum limits $max_1$, $max_2$, $max_3$, which is to say whether $|y^1_i| < max_1$ and $|y^1_{i+1}| < max_2$ and/or $|y^1_i - y^1_{i+1}| < max_3$.

In addition to the described evaluation of the positions $P_i$, additional measurement values of the position determination, such as orientation, speeds, pseudo ranges and the like, from a GNSS position determination can be used to improve or validate the detection of the crossing of the boundary 7.

CONCLUSION

The invention is not limited to the shown embodiments, but encompasses all variants and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents

What is claimed is:

1. A method for identifying a vehicle using a predetermined location, comprising:

carrying, on the vehicle, an onboard unit that via radio repeatedly broadcasts status messages, which each indicate a current position of the onboard unit and a radio identifier that changes after each or several status messages;

receiving at least one status message in a radio beacon;

detecting a location usage of the vehicle by evaluating the at least one status message based on one or more positions indicated therein with respect to the predetermined location;

transmitting an identification request from the radio beacon to the onboard unit which is addressed by way of the radio identifier from the at least one status message; and receiving and conducting a legitimacy check of the identification request in the onboard unit and, if the request is legitimate, transmitting an identification of the onboard unit to the radio beacon, the identification remaining the same over several changes of radio identifier.

2. The method according to claim 1, wherein at least two status messages are received by a radio beacon and are associated with each other based on the radio identifiers indicated therein, and the location usage of the vehicle is detected by evaluating the mutually associated status messages based on the one or more positions indicated therein with respect to the predetermined location.

3. The method according to claim 1, wherein the legitimacy check is conducted by checking a cryptographic sender certificate of the radio beacon that is transmitted by the radio beacon along with the identification request.

4. The method according to claim 1, wherein the identification of the onboard unit is transmitted to the radio beacon via an encrypted channel.

5. The method according to claim 1, wherein the identification received by the radio beacon is recorded together with a time stamp in a memory so as to log the location usage.

6. The method according to claim 1, wherein the identification received by the radio beacon is compared to at least one previously stored legitimate identification so as to authorize the location usage.

7. The method according to claim 1, wherein the identification received by the radio beacon is used to search for and debit a toll account associated with the identification so as to toll the location usage.

8. The method according to claim 1, wherein the radio beacon transmits a beacon identifier that is unique to the radio beacon to the onboard unit, the onboard unit storing the beacon identifier and transmitting the beacon identifier at least along with a subsequent broadcast of the status message(s) thereof or transmission of the identification thereof, and the radio beacon ignores a status message or identification received from an onboard unit if the beacon identifier received along therewith is identical to its own beacon identifier.

9. The method according to claim 1, wherein more than two status messages are received and associated with each other, and a trajectory of the onboard unit is calculated based on the one or more positions indicated therein, the trajectory being compared to the predetermined location so as to detect the location usage.

10. The method according to claim 1, wherein the radio identifier is changed after every 20 to 100 status messages.

11. The method according to claim 1, wherein the radio identifier is changed at the earliest after expiration of a predetermined time period.

12. The method according to claim 1, wherein the radio identifier is kept the same while the onboard unit is present in the radio coverage range of the same radio beacon.

13. The method according to claim 1, wherein each status message also indicates a current movement vector of the onboard unit that is also used during the detection of the location usage.

14. The method according to claim 1, wherein the position of the onboard unit is determined by way of satellite navigation and improved by referencing to a reference position of the radio beacon that was determined by way of satellite navigation.

15. The method according to claim 1, wherein the position of the onboard unit is determined by way of satellite navigation and improved by referencing to at least one further position of a neighboring onboard unit that was determined by way of satellite navigation.

16. The method according to claim 1, wherein the radio coverage range of the radio beacon contains the predetermined location.

17. The method according to claim 1, wherein the location is a geographical point and the location usage is a drop below a maximum distance from the point.

18. The method according to claim 1, wherein the location is at least one road segment and the location usage is travel on the at least one road segment.

19. The method according to claim 1, wherein the location is a boundary and the location usage is a crossing of the boundary, wherein the boundaries are represented on a digital road map with vectorized road segments, comprising:

determining a point of intersection of the boundary with a road segment and a reference direction in the orientation of this road segment;

successively projecting vectors, each determined between one of the positions from the status messages and the point of intersection, onto the reference direction, in order to obtain a sequence of projections; and detecting a crossing of the boundary if a change of direction or sign occurs in the sequence of projections.

20. The method according to claim 19, wherein the projecting is done by forming vectorial inner products of the vectors with the reference direction, and a crossing of the boundary is detected by a change of sign of the inner products.

21. The method according to claim 19, wherein the projecting is done by transforming the vectors into a local coordinate system with the reference direction as the x-axis, and a crossing of the boundary is detected by a change of sign of their x-coordinates.

22. The method according to claim 19, further comprising:

validating the crossing of the boundary if the absolute values of two projections lying before and after the change of direction or sign exceed a predetermined minimum.

23. The method according to claim 19, further comprising:

validating the crossing of the boundary if the normal distances of two positions lying before and after the change of direction or sign from the reference direction do not exceed a predetermined maximum.

24. A radio beacon for identifying a vehicle using a predetermined location, the vehicle carrying an onboard unit that via radio repeatedly broadcasts status messages, which each indicate a current position of the onboard unit and a radio identifier that changes after each or several status messages, the radio beacon configured to, with the aid of a processor and a transceiver connected thereto, receive at least one status message;

detect a location usage by evaluating the at least one status message based on one or more positions indicated therein with respect to the predetermined location;

transmit an identification request to that onboard unit which is addressed by way of the radio identifier from the at least one status message; and receive an identification of the onboard unit that remains the same over several radio identifier changes.

25. The radio beacon according to claim 24, further configured to:

receive at least two status messages and associate these with each other based on the radio identifiers indicated therein, and detect the location usage of the vehicle by evaluating the mutually associated status messages based on the one or more positions indicated therein with respect to the predetermined location.

26. The radio beacon according to claim 24, further containing a cryptographic sender certificate and being configured to transmit the cryptographic sender certificate along with the identification request.

27. An onboard unit, comprising a processor, a satellite navigation receiver for position determination, and a transceiver for radio communication, wherein the onboard unit is configured to, with the aid of the transceiver, repeatedly broadcast via radio status messages, which each contain a position determined by the satellite navigation receiver and a radio identifier of the onboard unit that changes after several status changes, the onboard unit further configured to receive, from a radio beacon, an identification request that is addressed to the current radio identifier of the unit and contains a cryptographic sender certificate;

validate the sender certificate; and if the sender certificate is valid, transmit an identification of the onboard unit to the radio beacon, the identification remaining the same over several changes of radio identifier.

28. The onboard unit according to claim 27, wherein the status messages thereof are CAMs according to the ITS-G5 standard or BSMs according to the WAVE standard.

* * * * *

UNITED STATES PATENT AND TRADEMARK OFFICE
CERTIFICATE OF CORRECTION

PATENT NO. : 9,171,467 B2  
APPLICATION NO. : 13/868908  
DATED : October 27, 2015  
INVENTOR(S) : Refi-Tugrul Güner Page 1 of 1

It is certified that error appears in the above-identified patent and that said Letters Patent is hereby corrected as shown below:

On the title page item 74, in column 2, in "Attorney, Agent, or Firm", line 1, delete "Piala" and insert -- Fiala --, therefor.

Signed and Sealed this  
Sixteenth Day of February, 2016

Michelle K. Lee  
*Director of the United States Patent and Trademark Office*